Figure 1:
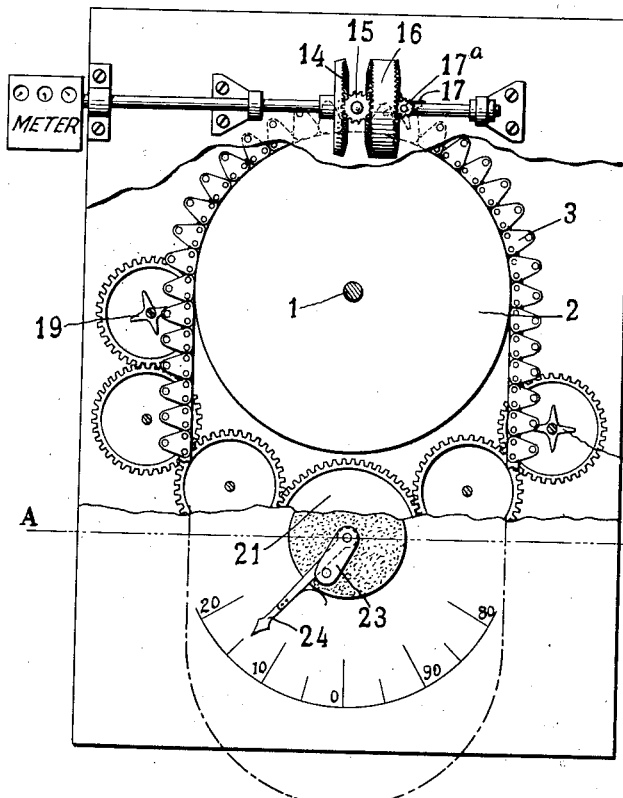

H. S. HATFIELD.
MEANS FOR MEASURING THE RATE OF MOVEMENT OF A MECHANISM AVERAGED OVER ANY PREDETERMINED PERIOD OF TIME.
APPLICATION FILED APR. 1, 1911.

1,094,439.  Patented Apr. 28, 1914.

WITNESSES

INVENTOR
Henry Stafford Hatfield,
BY
ATTORNEY

UNITED STATES PATENT OFFICE.

HENRY STAFFORD HATFIELD, OF JENA, GERMANY.

MEANS FOR MEASURING THE RATE OF MOVEMENT OF A MECHANISM AVERAGED OVER ANY PREDETERMINED PERIOD OF TIME.

1,094,439.   Specification of Letters Patent.   Patented Apr. 28, 1914.

Application filed April 1, 1911. Serial No. 618,379.

*To all whom it may concern:*

Be it known that I, HENRY STAFFORD HATFIELD, residing at 12 Löbdergraben, Jena, Germany, electrochemist, have invented a new or Improved Means for Measuring the Rate of Movement of a Mechanism Averaged Over Any Predetermined Period of Time, of which the following is a specification.

My invention relates to a new or improved means for measuring the rate of movement of a mechanism averaged over any predetermined period of time.

In carrying out my invention I provide means for measuring at any moment the total movement of the mechanism up to that moment, the total movement of the mechanism up to a predetermined period of time previous to that moment, and the difference between the two. This difference represents the total movement of the mechanism during the predetermined period of time that has elapsed and it also represents the average rate of movement during the said time.

My invention is specially though not exclusively applicable in the case of electrical demand indicators of that kind in which the maximum current averaged over a predetermined interval of time is indicated and in order to facilitate description I shall describe it as applied in the case of such demand indicators. In hitherto known electrical demand indicators of this kind such for example as that described in the British Patent of Merz No. 5530 of 1902 the consumption during certain hours or fractions thereof chosen quite at random is measured and the maximum of these measurements indicated. By my invention however I obtain an indication of the maximum consumption during any hour or in other words an indication of the consumption in that past hour in which the consumption was greatest. In order to attain this result I provide means for measuring at any moment the reading of the meter at that moment and also the reading of the meter at some predetermined interval of time past such for example as one hour. I also provide means for continuously measuring the difference between these two readings which difference gives the consumption during the past hour and the maximum value of this difference at the end of any period of time gives the maximum consumption during any hour of such period of time.

In one form of demand indicator constructed under my invention, I cause the meter to drive two trains, the one directly, and the other indirectly and in such a manner that the indication of the second train is always one hour behind that of the first or directly driven train. Thus at any moment the first train has moved through a distance corresponding with the consumption during the period which has elapsed from the last setting up to that moment, while the second train has moved through a distance corresponding to the consumption during the period which has elapsed from the last setting up to one hour before that moment. I connect the trains by means of some form of differential gearing which at any moment gives the difference between the total movement of the two trains respectively up to that moment and by means of a maximum indicating device such for example as a resetting index, I measure the maximum value of this difference. I thus obtain an indication of the maximum consumption during any hour of the time which has passed since the last setting of the apparatus. By employing a minimum indicating device I obtain an indication of the minimum consumption.

In order that my invention may be readily understood I shall now proceed to describe it as applied in the case of a maximum demand indicator constructed as an attachment to an ordinary mechanical meter of any sort. For this purpose I shall refer to the accompanying drawings, which illustrate in a more or less diagrammatic manner such an application of my invention.

Figure 2:
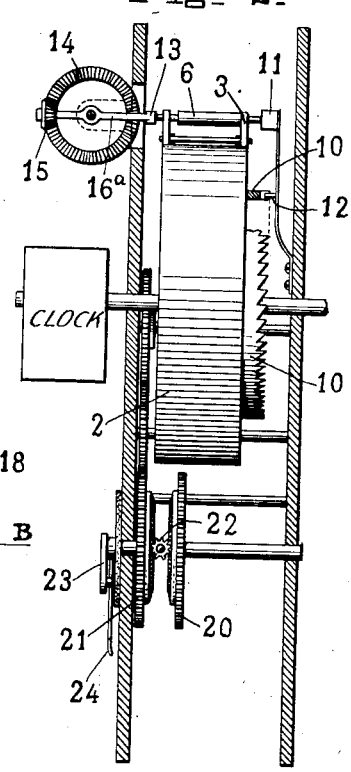
Figure 3:
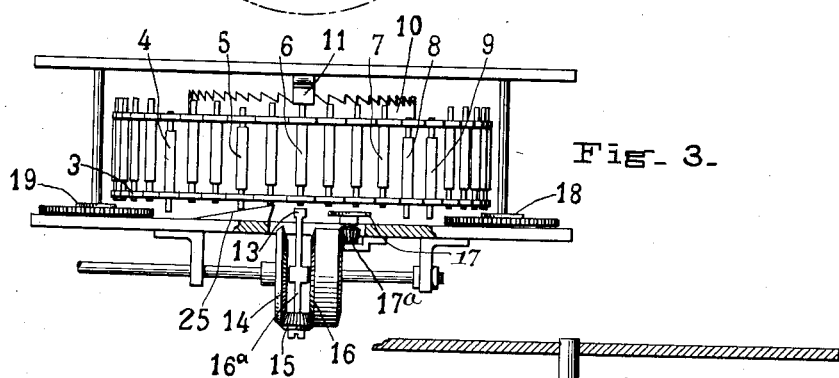
Figure 4:
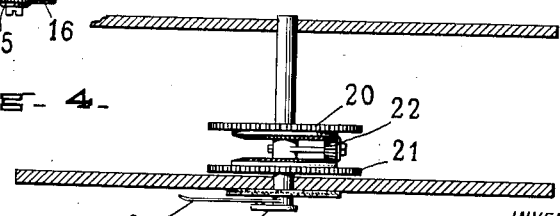

In the drawings, Figure 1 is an elevation (front), Fig. 2 a side elevation, partly in section, Fig. 3 a plan, and Fig. 4 a section through A B of Fig. 1.

The spindle 1 is driven by suitable clockwork at a fixed rate. It carries a drum 2, over which the endless chain 3 hangs in a loop, its lower part being free. Each link of the chain is bored with a small hole, and in each hole fits a loose horizontal pin (4, 5, 6, 7, 8, 9, &c.) with a sliding fit, so that it retains its position when the apparatus is properly mounted, but can by a slight force be displaced a short distance in the direction of its length. The spindle 1 also carries a toothed wheel 10. (Figs. 2 and 3). A spring hammer 11 is fixed at its lower end and weighted at its upper. It carries a small cam-piece 12 with which the teeth of the wheel 10 engage. By the motion of the wheel 10 the spring is pushed to one side (to the right in Fig. 2) and let go suddenly; its upper end being weighted. It then springs through its position of rest over to the other side sufficiently far to hit that pin on the chain 3 which happens to be in the front of it (pin 6 Fig. 3). The pin may thus be pushed out of place by the blow, as pins 8, 9 have been, or the stop 13 may prevent this taking place, if it is in its zero position.

The motion of the stop 13 is controlled in the following way: Toothed wheels 14, 15 and 16 form together what is known as a differential gearing. 14 is a crown wheel, 15 a pinion mounted on the rod 16$^a$, which is rigidly attached to a short rod passing through its center at right angles to it and secured by a screw. The ends of this rod fit loosely into the ends of the spindles carrying the wheels 14 and 16. When the wheels 14 and 16 turn in opposite directions at equal rates, the pinion turns on its own axis, but the rod 16$^a$ remains stationary. When one wheel moves faster than the other, the rod 16$^a$ turns. Its end is formed by the stop 13.

The wheel 16 has a second crown face, facing to the right in Figs. 1 and 3. A pinion 17$^a$ and star wheel 17 are rigidly fixed together on the same axis, and so fixed that the pinion engages with the crown face of wheel 16, while the star wheel is turned through one tooth each time a pin passes by which has been knocked out by the hammer 11, the wheel 16 being therefore also moved through a short distance by the pinion. The wheel 14 is geared to the meter the motion of which is to be averaged, in such a manner that it turns in the opposite sense to 16. If then 14 does not travel too fast, it is possible for any speed of it up to a certain limit to turn the wheel 16 by means of knocked-out pins just as fast in the opposite direction as the wheel 14 is being turned in a given direction. This is effected automatically by the apparatus as described for if the wheel 16 turns too slowly, the stop 13 is displaced, and this allows a pin to be knocked out; the same pin immediately afterward moves the wheel 16, and in doing so replaces the stop. The stop 13 in other words oscillates to and fro and allows just as many pins to be knocked out as are necessary to keep the motion of wheel 16 equal and opposite to that of 14. What is more, the number of pins knocked out will be proportional to the motion of the meter. Any other star wheel similar to 17, placed in the path of the chain, will therefore receive a motion through the knocked out pins proportional to the motion of the meter. There will however be a certain delay, a sort of retardation of phase, caused by the time taken by a pin on the chain to travel from the star wheel 17 to the star wheel in question. Two such star wheels 18 are provided, the one 18 being actuated by the pins after a short time interval. But a pin takes a time equal to the period over which the instrument is required to average to travel from the star wheel 18 to the star wheel 19. I assume this period to be one hour. The total number of turns taken by the wheel 18, starting from any given moment, is thus seen to be proportional to the total number of turns of the meter taken from the same moment, since we disregard the time which the pins take to pass from 17 to 18. The reason we may disregard this time is because we can place 18 near to 17 and we can make the chain as long as we like. The total number of turns of the star wheel 19 will be equal of those of 18 less the number made by 18 during the hour preceding the moment of observation. The number of turns of the star wheel 18 less those of the star wheel 19 are, then, proportional to the number of turns of the meter for one hour prior to the moment of observation, the time it takes the chain to pass from 17 to 18, it is repeated, being disregarded. If however we take account of this time, we must add it to the time in question and consider it as we would a retardation of phase. After actuating the star wheel 19, the pins are brought back to their original position by the inclined plane 25 before again reaching the hammer or displacing device.

The wheels 18 and 19 are geared through intermediate gearing with the wheels 20 and 21 respectively which are rigidly and concentrically attached to crown wheels forming a differential gearing with the pinion 22. For convenience of nomenclature, I call this differential gearing a differential device to distinguish it from the differential gearing 14, 15, 16. The piece on which this pinion 22 is mounted is rigidly attached to a rod running through the spindles of the wheels 20 and 21. This rod is attached to the pin plate 23. It is obvious that the displacement of the plate 23 from its original position is proportional to the difference in the number of turns taken by the wheels 20 and 21 or, what is the same thing, the star wheels 18 and 19 to which the wheels 20 and 21 are respectively geared; that is to say, it is proportional to the consumption for one hour prior to the time of observation. In designing the instrument, it is arranged that the displacement of 23 can never be equal to a whole turn, when the meter is running at its greatest possible overload. The displacement of 23 from its zero position is thus always proportional to the consumption registered on the meter during the hour previous to the moment of observation. A loose non-return hand 24 gives the maximum value of this consumption during any one of the hours during which the instrument has been operating and the hand has not been reset, which is, in the majority of cases, what is required in practice.

For convenience I designate the part 11 or any part having similar functions a displacer and the part 13 a stop. The star wheel 17 is a stepping device since it is moved stepwise by the displaced elements. The parts 18 and 19 and the elements which they operate are counting trains and the chain the conveying device.

Innumerable other modifications may be made without departing from the spirit of my invention, and I do not limit myself to the precise form described and illustrated. Nor do I limit myself to the employment of my invention in connection with electrical maximum demand indicators.

Having thus described my invention, what I claim as new and desire to secure by Letters Patent is;

1. A measuring instrument for measuring the rate of movement of a moving part over a predetermined period of time, consisting of a counting train measuring the total movement of the part up to a given moment, a second counting train measuring the total movement of the part up to a predetermined period of time previous to the given moment, and a differential device for measuring the difference between the two, substantially as described.

2. A measuring instrument for measuring the rate of movement of a moving part over a predetermined period of time, consisting of a counting train measuring the total movement of the mechanism up to a given moment, a second counting train measuring the total movement of the mechanism up to a predetermined period of time previous to the given moment, a differential device for measuring the difference between the two, and a maximum indicating device for the differential device, substantially as described.

3. In a measuring instrument, a differential gear; a conveying device adapted to move at a fixed rate and carrying spaced displaceable elements; a part whose movement is to be measured connected to one of the members of the differential gear; a stepping device adapted to be moved by the displaceable elements, when displaced, connected to another member of the differential gear; and a stop for the displaceable elements whose position is controlled by the differential gear, substantially as described.

4. In a measuring instrument, a differential gear; a conveying device adapted to move at a fixed rate and carrying spaced displaceable elements; a part whose movement is to be measured connected to one of the members of the differential gear; a stepping device adapted to be moved by the elements, when displaced, connected to another member of the differential gear; a displacer for the displaceable elements; and a stop for such elements whose position is controlled by the differential gear, substantially as described.

5. In a measuring instrument, a part whose movement is to be measured, a conveying device carrying displaceable elements; a displacer arranged to displace the elements in number proportional to the movement of the part whose movement is to be measured, and two counting trains adapted to be operated by the elements, when displaced, whereby the motion of the part during a given time interval may be measured, substantially as described.

6. A maximum demand indicator having a moving part; a conveyer having spaced displaceable elements, the displacement of which is controlled by the extent of movement of the moving part; two counting trains operated by the displaced elements placed at points in the path of the conveyer corresponding to the time interval chosen; a differential device connected with these trains, and an indicator controlled by the differential device, substantially as described.

In witness whereof I have signed my name to this specification in the presence of two subscribing witnesses.

HENRY STAFFORD HATFIELD.

Witnesses:
 PAUL KRÜGER,
 EMIL DÖUITZ.